(12) United States Patent
Jones et al.

(10) Patent No.: US 7,996,497 B2
(45) Date of Patent: Aug. 9, 2011

(54) METHOD OF HANDLING DUPLICATE OR INVALID NODE CONTROLLER IDS IN A DISTRIBUTED SERVICE PROCESSOR ENVIRONMENT

(75) Inventors: Michael John Jones, Cedar Park, TX (US); Ajay Kumar Mahajan, Austin, TX (US); Rashmi Narasimhan, Roundrock, TX (US); Atit D. Patel, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 506 days.

(21) Appl. No.: 12/164,318

(22) Filed: Jun. 30, 2008

(65) Prior Publication Data

US 2009/0327654 A1 Dec. 31, 2009

(51) Int. Cl.
*G06F 15/177* (2006.01)
(52) U.S. Cl. ............ 709/220; 709/227; 712/28; 714/48
(58) Field of Classification Search .................. 709/201, 709/220, 221, 222, 223, 224, 227, 228; 710/9, 710/10, 14, 15, 100; 712/28; 714/4, 25, 714/31, 48, 49, 100
See application file for complete search history.

(56) References Cited

U.S. PATENT DOCUMENTS

| | | | |
|---|---|---|---|
| 6,148,361 A | 11/2000 | Carpenter et al. | |
| 6,704,819 B1 | 3/2004 | Chrysanthakopoulos | |
| 6,735,619 B1 * | 5/2004 | Sawada | 709/212 |
| 6,987,726 B1 * | 1/2006 | Elliott | 370/217 |
| 7,236,488 B1 | 6/2007 | Kavipurapu | |
| 7,307,994 B2 | 12/2007 | Kurita | |
| 7,512,675 B2 * | 3/2009 | Sandaire | 709/223 |
| 2004/0047298 A1 * | 3/2004 | Yook et al. | 370/254 |
| 2004/0059817 A1 * | 3/2004 | Ueno et al. | 709/224 |
| 2004/0157600 A1 | 8/2004 | Stumpert et al. | |

FOREIGN PATENT DOCUMENTS

EP 330834 9/1989

OTHER PUBLICATIONS

Wikipedia, "Dynamic Host Configuration Protocol", Jun. 29, 2008, 12 pages, retrieved from http://en.wikipedia.org/wiki/Dhcp.*

* cited by examiner

*Primary Examiner* — David J Huisman

(57) ABSTRACT

A method for enabling a Node Controller (NC), which claims a duplicate or invalid service processor Node Controller Identification (NCID) in a distributed service processor system, to be integrated into the system includes reading an NCID by the NC after the NC is booted, saving the NCID into a non-volatile storage and broadcasting an NC Present Message (NPM) to a System Controller (SC) repeatedly until the SC initiates communication, updating the NCID for the NC in the non-volatile storage when the NC receives an NCID change message from the SC and rating any future NPM as a new NCID, and checking a record of a new NC when the SC receives the NPM from the NC. If the SC has a record of a recorded NC with the same NCID as the new NC, then the SC checks its role as a primary SC. If the SC does not have the record of the recorded NC with the same NCID as the new NC, then the SC checks validity of the NCID.

1 Claim, 4 Drawing Sheets

METHOD OF HANDLING DUPLICATE OR INVALID NODE CONTROLLER IDS IN A DISTRIBUTED SERVICE PROCESSOR ENVIRONMENT

BACKGROUND OF THE INVENTION

1. Field of the Invention

The present invention generally relates to a method and system for handling duplicate or invalid service processor identifications (IDs) in a distributed service processor environment.

2. Description of the Related Art

A large computer (system) can contain a Service Processor (SP). The SP is an embedded computer that manages the system. The SP typically initializes and configures various system hardware, initiates the Initial Program Load (IPL) for the system, reports error and event logs to a Hardware Management Console (HMC), controls firmware update for the system, and continuously monitors the system health.

High End systems can contain a number of SPs connected by a network (e.g., an Ethernet) including a pair of redundant System Controllers (SCs) that perform management of the whole system, and a number of pairs of redundant Node Controllers (NCs) that control devices in the hardware subsystem in which they are located.

A pair of redundant SPs includes a Primary SP and a Backup SP. The primary SP carries out most of the tasks and the backup SP is available to fail-over to in the event that the primary SP fails. It can be seen that in a system with 8 nodes, there can be 18 separate SPs. Two NCs in each node and a single pair of SCs.

In a typical implementation, a software component on each SC keeps track of which NCs are present and handles communication to the NCs. The NCs are uniquely identified by a number called the Node Controller ID (NCID) which encodes the NC's location (e.g. NC4A (node 4, position A)). Other software components on an SC can communicate with a particular NC by calling functions with a parameter specifying the NCID. The NCs flag themselves as present by repeatedly sending NC Present Messages (NPMs) containing their NCID to both SCs until a response is received from each SC. An NC finds out its NCID by reading the status of some hardware pins on the system backplane which are hardwired to reflect the NC location.

A problem occurs when there is a fault with the hardware pins that reflect the NC position. The problem may be a misplug of the NC in the backplane, a short circuit, or a bent pin. The fault results in the NC getting its location information and (NCID) wrong. This can result in either the SC seeing an NC with an Invalid NCID (e.g., an NCID outside the range of normal IDs) or a Duplicate NCID (e.g., an NCID that is already known about). The SCs must have a way of dealing with these NCs.

A standard solution may cope with this problem by simply ignoring an NC that sends an NPM with an Invalid or Duplicate NCID. This approach has two main problems. Firstly, the NC will continue to send NPMs which are ignored (i.e., filling up trace tables and consuming processor's space). Secondly, it is difficult to extract debug data from the NC to solve the problem because communication has not been initiated with the NC.

SUMMARY OF THE INVENTION

In view of the foregoing and other exemplary problems, drawbacks, and disadvantages of the conventional methods and structures, an exemplary feature of the present invention is to provide a method and system for handling duplicate or invalid service processor IDs in a distributed service processor environment.

An exemplary embodiment of the present invention includes a system in which NCs read their NCID from hardware and then store the NCID in a non-volatile memory. This allows the NCID to be updated. The Primary SC recognizes when an NC has a Duplicate NCID, sends a message to the NC instructing the NC to change it's NCID to an Invalid NCID to turn a Duplicate NCID into an Invalid NCID, and creates an Error Log to inform the user that there is an Duplicate NCID problem.

The Primary SC recognizes when an NC has an Invalid NCID, initiates communication with the NC, enables only those NC functions that are necessary for data collection, and creates an Error Log to inform the user that there is an Invalid NCID problem.

Some advantages of the exemplary aspects of the present invention over the standard solution are:

The SCs will initiate communication with NCs with bad NCIDs. This prevents the NCs from sending repeated NPMs which will save trace table space and processor MIPs.

NCs with bad NCIDs will not be able to take an active part in the system, but will be available for transferring debug data for problem analysis.

The system Error Logs created will be a clear indication of what the problem is.

It will be simple to collect debug data from the NC with a duplicate NCID to solve the problem.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Figure 1:
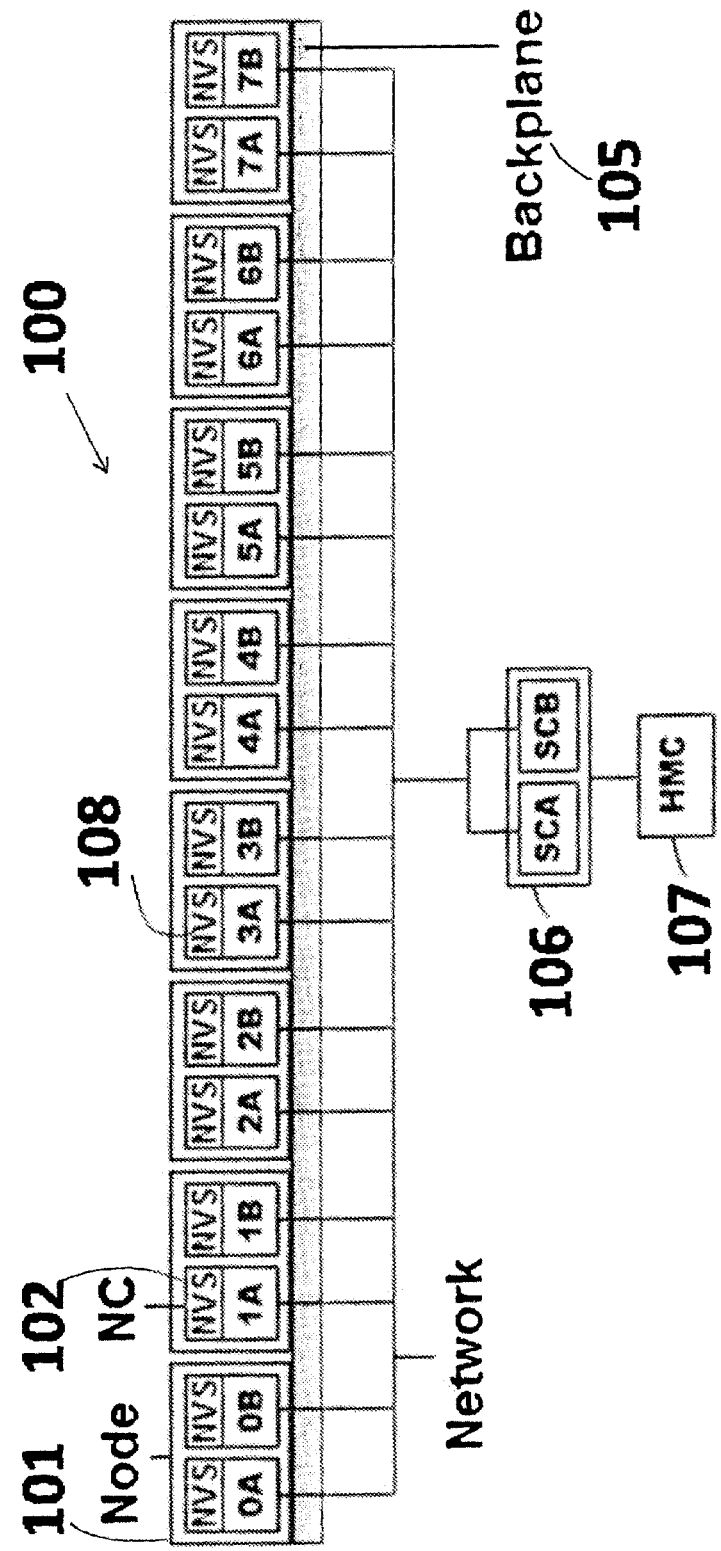
FIG. 1 illustrates an exemplary hardware of a distributed service processor environment according to an exemplary aspect of the present invention.

FIG. 1 represents hardware of a distributed service processor environment according to an exemplary aspect of the present invention. In system 100, a node 101 plugs into a backplane 105. Each node 101 has two NCs 102. A set of backplane pins feed into each NC 102 to inform the NC about its own location. An HMC 107 is connected to a pair of SCs 106 to control firmware update for the system.

Each NC 102 reads its location (NCID) from the pins after it has booted. The NC 102 saves its NCID into a non-volatile storage 108 and broadcasts an NPM to each SC 106 repeatedly until the SC 106 initiates communication.

The NPM includes the NCID, which is read from the non-volatile storage 108 each time a new NPM is sent; a Serial Number (SN), which is set in a read-only memory at a manufacturing plant and is unique for each NC 102; and a network address (e.g., an Ethernet address) that the SC must use to communicate with the NC 102.

When the NC 102 receives an NCID Change Message from an SC 106, the NC 102 updates its NCID in the non-volatile storage 108. Any future NPMs will contain a new NCID.

Figure 2:
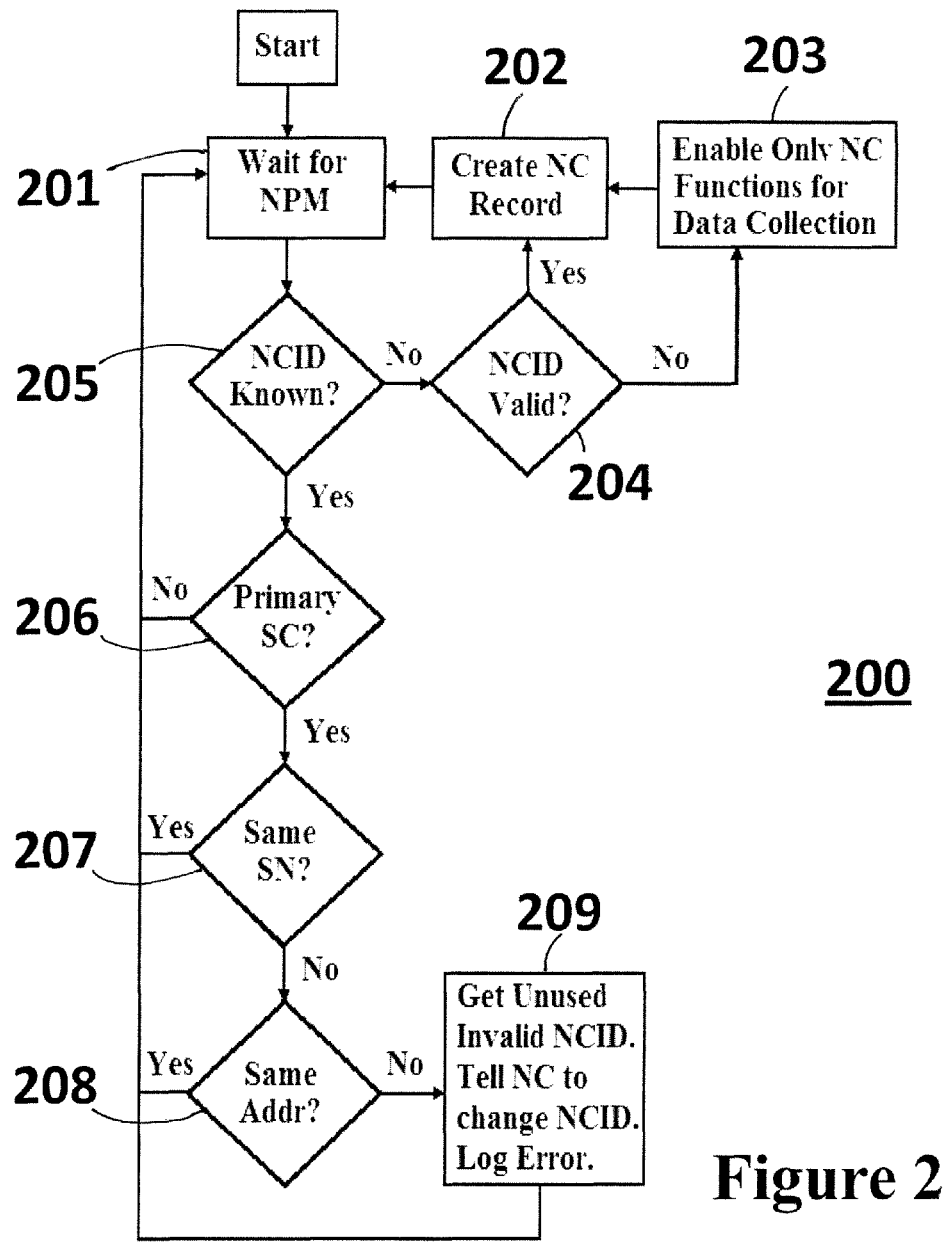
FIG. 2 illustrates operation of a system controller in a distributed service processor environment according to an exemplary aspect of the present invention.

FIG. 2 depicts an exemplary embodiment of operation of the system controller of the present invention in flowchart 200.

When the SC receives an NPM from a new NC, at step 201, the SC checks if it already has a record of an NC with the same NCID as the new NC.

If the SC already has the record of an NC with the same NCID at decision step 205, then the checks its role. If the SC is not a primary SC, at decision step 206, then the SC ignores the NPM. If the SC is a primary SC, then at decision step 207, the SC compares the SN of a recorded NC with the new NC.

If the SNs are the same, then the new NC is the same physical NC as the already known NC, and the SC ignores the NPM, which means once communication between the SC and NC is fully initiated, the NC will stop sending NPMs.

If the SNs are different, then the new NC is a different physical NC than the already known NC, and the SC, at decision step 208, compares network addresses of the recorded NC and the new NC.

If the network addresses are different, at step 209, the SC selects an unused, invalid NCID (i.e., one that is not within the range of normal NCIDs (e.g., from NC0A to NC7B in FIG. 1)). Then, the SC 106 sends a message to the new NC via the network address of the new NC instructing it to update its NCID to a new value, and logs an error.

If the network address of the new NC is the same as the network address of the already known NC, then the new NC is a different physical NC than the already known NC, but has the same network address, and the SC ignores the NPM, since any communication with the new NC risks being received by the known NC.

At decision step 205, if the SC does not have a record of an NC with the same NCID, then the SC checks validity of the NCID at step 204.

If the NCID is valid, then a data record including the new NC information is recorded at step 202, and the SC initiates communication with the new NC using a supplied network address.

If the NCID is invalid (i.e., outside the range of normal NCIDs (e.g., from NC0A to NC7B in FIG. 1)), then, at step 203, the SC instructs the new NC to only enable those functions necessary for data collection, and logs an error. Then a data record including the NC information is recorded, at step 202, and the SC initiates communication with the NC using the supplied network address.

It should be noted that Node Controller could be represented as an embedded data-processing system and the NPM messages could be transferred between SC and NC using various protocols and using various hardware/software.

Figure 3:
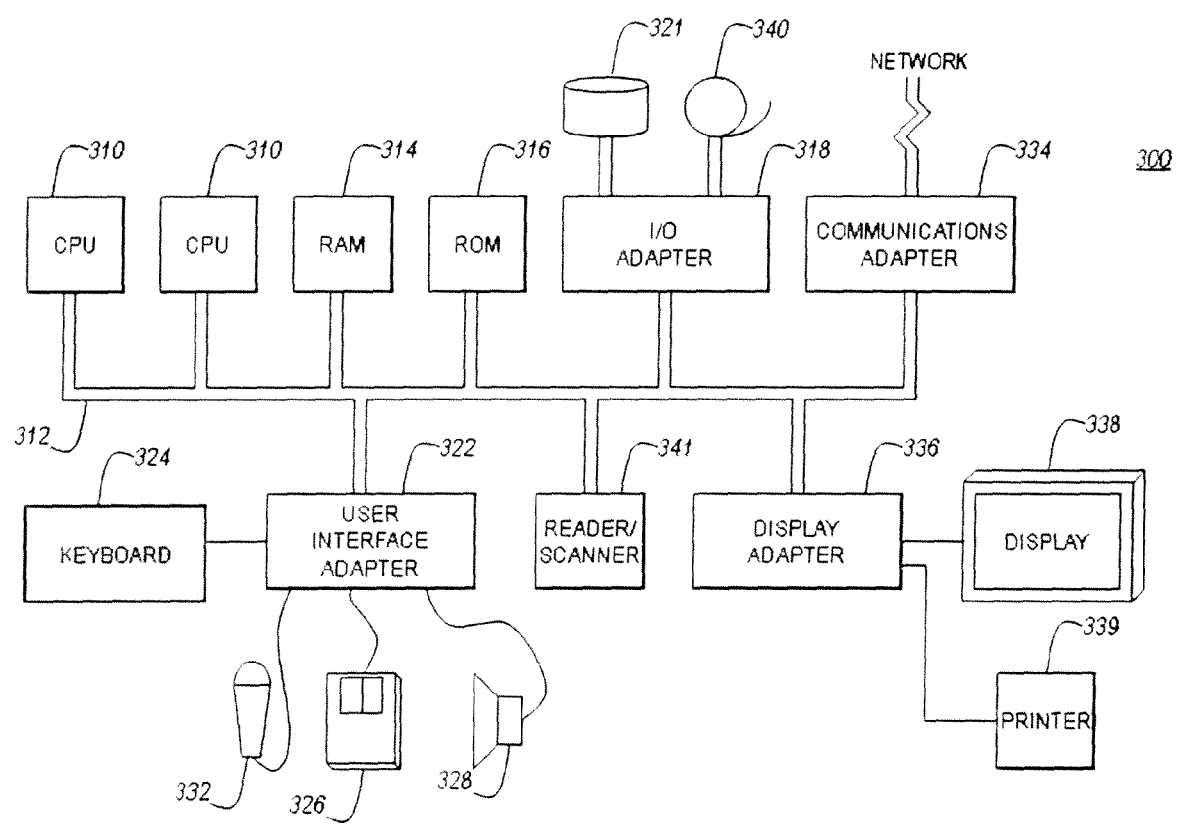
FIG. 3 illustrates an exemplary hardware/information handling system 300 for incorporating the present invention therein.

FIG. 3 illustrates a typical hardware configuration of an information handling/computer system for use with the invention and which preferably has at least one processor or central processing unit (CPU) 310.

The CPUs 310 are interconnected via a system bus 312 to a random access memory (RAM) 314, read only memory (ROM) 316, input/output (I/O) adapter 318 (for connecting peripheral devices such as disk units 321 and tape drives 340 to the bus 312), user interface adapter 322 (for connecting a keyboard 324, mouse 326, speaker 328, microphone 332, and/or other user interface device to the bus 312), a communication adapter 334 for connecting an information handling system to a data processing network, the Internet, an Intranet, a personal area network (PAN), etc., reader/scanner 341, and a display adapter 336 for connecting the bus 312 to a display device 338 and/or printer 339.

In addition to the hardware/software environment described above, a different aspect of the invention includes a computer implemented method for performing the above-described method. As an example, this method may be implemented in the particular environment discussed above.

Such a method may be implemented, for example, by operating a computer, as embodied by a digital data processing apparatus, to execute a sequence of machine readable instructions. These instructions may reside in various types of signal bearing media.

This signal bearing media may include, for example, a RAM contained within the CPU 310, as represented by the fast access storage for example. Alternatively, the instructions may be contained in another signal bearing media, such as a magnetic data storage diskette 400 (FIG. 4), directly or indirectly accessible by the CPU 310.

Whether contained in the diskette 400, the computer/CPU 310, or elsewhere, the instructions may be stored on a variety of machine readable data storage media, such as DASD storage (e.g., a conventional "hard drive" or a RAID array), magnetic tape, electronic read only memory (e.g., ROM, EPROM, or EEPROM), an optical storage device (e.g. CD ROM, WORM, DVD, digital optical tape, etc.), paper "punch" cards. In an illustrative embodiment of the invention, the machine readable instructions may comprise software object code, compiled from a language such as "C", etc.

Figure 4:
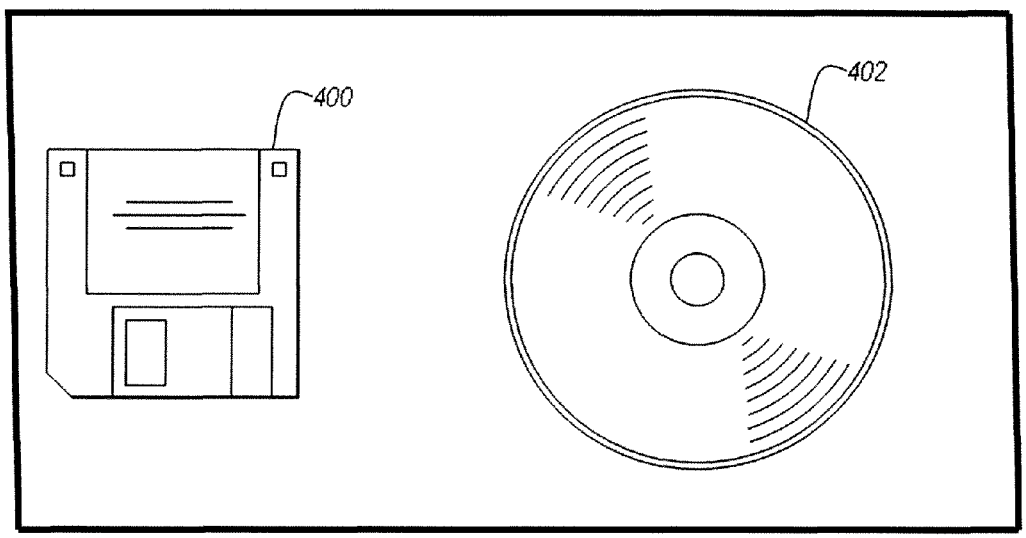
FIG. 4 illustrates a signal bearing medium 400 (e.g., storage medium) for storing steps of a program of a method according to the present invention.

FIG. 4 illustrates a signal bearing medium 400 (e.g., storage medium) and CD ROM 402 for storing steps of a program of a method according present invention.

While the invention has been described in terms of an exemplary embodiment, those skilled in the art will recognize that the invention can be practiced with modification within the spirit and scope of the appended claims.

In addition, it should be noted that any combination of the disclosed and/or claimed elements, matters and/or items may fall under the modifications aforementioned.

What is claimed is:

1. A method for enabling a Node Controller (NC), which claims a duplicate or invalid service processor Node Controller Identification (NCID) in a distributed service processor system, to be integrated into the system, said method comprising:

reading an NCID by the NC after the NC is booted;

saving the NCID into a non-volatile storage and broadcasting an NC Present Message (NPM) to a System Controller (SC) repeatedly until the SC initiates communication, wherein the NPM comprises:

the NCID, which is read from said non-volatile storage each time a new NPM is sent;

a pre-assigned Serial Number (SN) which is set in a read-only memory and is unique for each NC; and a network address that the SC uses to communicate with the NC;

updating the NCID for the NC in the non-volatile storage when the NC receives an NCID change message from the SC and rating a future NPM as a new NCID; and checking a record of a new NC when the SC receives the NPM from the new NC, wherein if the SC has a record of a recorded NC with the same NCID as the new NC, then the SC checks its role as a primary SC, wherein if the SC is not the primary SC, then the SC ignores the NPM, wherein if the SC is the primary SC, then the SC compares an SN of the recorded NC with an SN of the new NC, wherein if the SN of the recorded NC and the SN of the new NC are the same, then the new NC is the same physical NC as an already known NC, and the SC ignores the NPM, wherein if the SN of the recorded NC and the SN of the new NC are different, then the new NC is a different physical NC than the already known NC, and the SC compares network addresses of the recorded NC and the new NC, wherein if the network addresses of the recorded NC and the new NC are different, then the SC selects an unused-invalid NCID, sends a message to the new NC via the network address of the new NC instructing the new NC to update its NCID to a new value, and logs an error, wherein if the network addresses of the recorded NC and the new NC are the same, then the new NC is a different physical NC than the already known NC, but has the same network address, and the SC ignores the NPM, wherein if the SC does not have the record of the recorded NC with the same NCID as the new NC, then the SC checks validity of the NCID, wherein if the NCID is valid, then a data record including information on the new NC is recorded, and the SC initiates communication with the NC using a supplied network address, wherein if the NCID is invalid, then the SC instructs the new NC to only enable functions necessary for data collection, logs an error, records data including the NC information, and initiates communication with the new NC using the supplied network address.

* * * * *